Nov. 8, 1927.
R. H. STACY
1,648,428
MACHINE FOR TESTING ELECTROMAGNETIC SOUND REPRODUCERS
Filed March 18, 1927
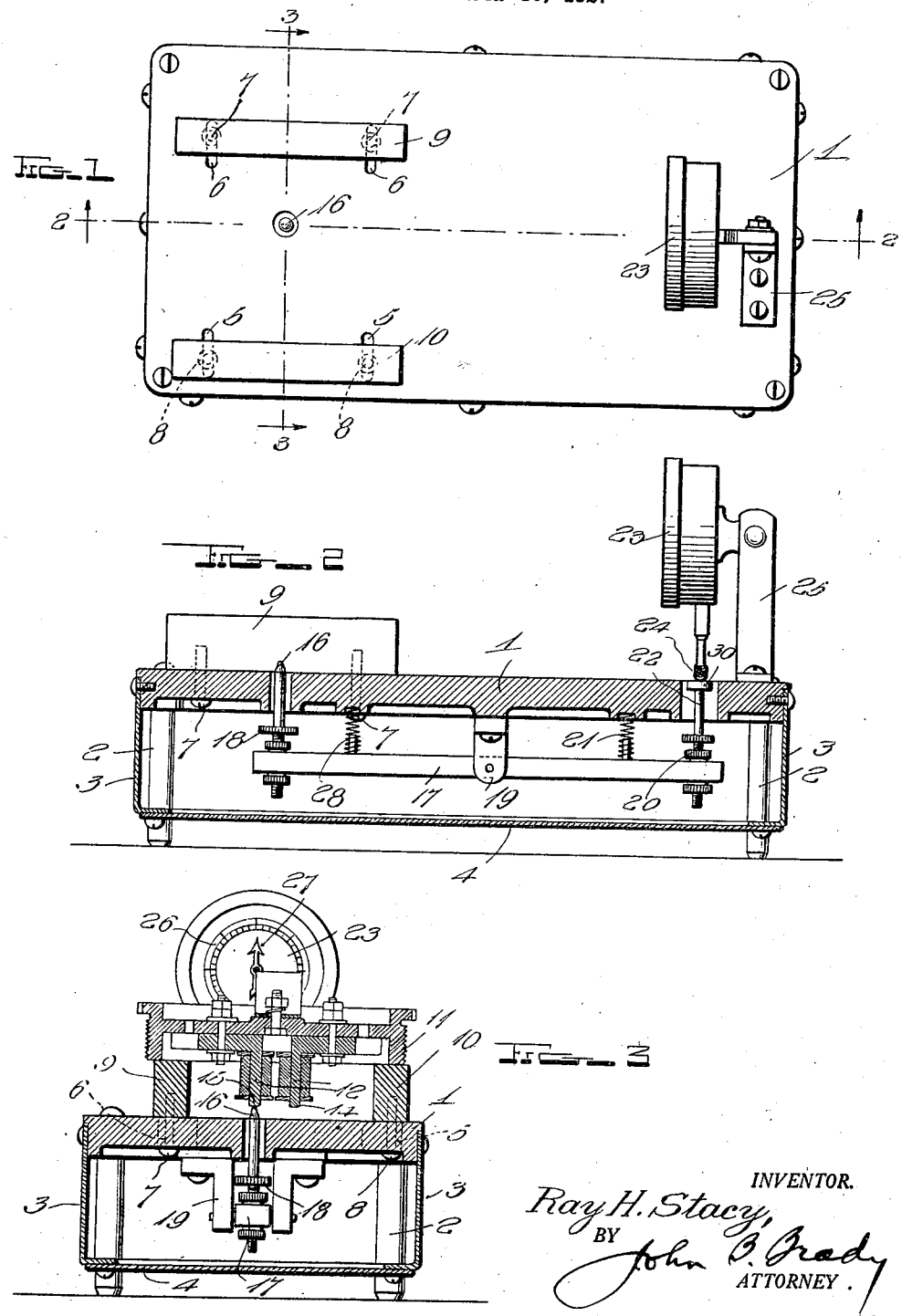
INVENTOR.
Ray H. Stacy,
BY
John B. Brady
ATTORNEY.

Patented Nov. 8, 1927.

1,648,428

UNITED STATES PATENT OFFICE.

RAY H. STACY, OF EAST ORANGE, NEW JERSEY, ASSIGNOR TO BRANDES LABORATORIES INC., OF NEWARK, NEW JERSEY, A CORPORATION OF NEW JERSEY.

MACHINE FOR TESTING ELECTROMAGNETIC SOUND REPRODUCERS.

Application filed March 18, 1927. Serial No. 176,437.

My invention relates broadly to machines for testing electromagnetic sound reproducers and more particularly to a depth grinding testing machine for the pole pieces of sound reproducers.

One of the objects of my invention is to provide a machine for testing the grinding depth of the pole pieces of electromagnetic sound reproducers for insuring a magnetic gap of a predetermined dimension between the armature member and the pole pieces of an electromagnetic sound reproducer.

Another object of my invention is to provide a direct reading depth testing machine for testing electromagnetic sound reproducers during the course of manufacture of the sound reproducer for insuring an accurate setting of the magnetic gap between the driving armature member and the pole pieces of the electromagnetic sound reproducer.

Other and further objects of my invention reside in the construction and arrangement of parts for a direct reading depth grinding testing machine as more fully set forth in the following specification and illustrated in the accompanying drawings in which:

Figure 1 is a plan view illustrating the depth grinding testing machine of my invention; Fig. 2 is a longitudinal cross-sectional view taken through the machine of Fig. 1 on line 2—2 thereof; and Fig. 3 is a lateral cross-sectional view taken through the machine on line 3—3 of Fig. 1.

Heretofore in the manufacture of electromagnetic sound reproducers on a quantity production basis it has been difficult to rapidly test electromagnetic sound reproducers passing through a production program for determination of the grinding depth of the pole pieces. By reason of the difficulty in securing a rapid and accurate knowledge of the depth of the pole pieces, the normal dimension of the magnetic gap between the driving armature and the pole pieces of the electromagnetic driving system has been generally neglected, and as a result the operating characteristics of the electromagnetic sound reproducer derived under conditions of extensive production have not been uniform. The machine of my invention was developed with a view of rapidly determining the grinding depth of the pole pieces of an electromagnetic sound reproducer in such manner that relatively unskilled labor might accept or reject electromagnetic sound reproducers passing through a production program so that the rejected electromagnetic sound reproducers of too small or too large a magnetic gap might be returned for regrinding or replacement of the pole pieces, while the accepted electromagnetic sound reproducers might be passed rapidly to the next production process in the manufacturing program.

Referring to the drawings in more detail, reference character 1 represents a base on which the testing apparatus is mounted, the base being spaced from a supporting surface by means of clip members 2. A depending casing 3 surrounds the peripheral edge of the base 1 providing a casing for the operating mechanism beneath the base. A bottom cover 4 completes the enclosure of the mechanism beneath the base. Sets of aligned slots are provided on opposite sides of the center of base 1, and through these slots sets of adjusting screws 7 and 8 are passed and enter the rectangular bars 9 and 10. By loosening the screws 7 and 8 the rectangular bars may be laterally adjusted with respect to each other and brought relatively close together or moved relatively far apart. The rectangular bars provide a support for the casing of the electromagnetic sound reproducer indicated at 11. The electromagnetic sound reproducer is illustrated in Fig. 3 in position upon the testing machine where pole pieces 12 have the tips 14 and 15 thereof presented for test with respect to grinding depth. The tips 14 and 15 of the pole pieces may contact with plunger 16 during the process of determining the grinding depth of the pole pieces. The plunger 16 may be adjusted by means of screw device 18 in the pivotally mounted lever 17 which is journaled in members 19 suspended from the under-surface of base 1. At the opposite end of the lever 17 an adjustable member 22 is positioned under control of a screw device 20, the adjustable member 22 having a head 30 thereon arranged to abut with the plunger member 24 of the micrometer 23, which is supported from a bracket 25 on base 1. The screw devices 18 and 20 separately control the position of plunger 16 and member 22. Each screw device is in the form of a knurled flange having a screw threaded shank which may be rotated to a desired position and then gripped in a selected position by means of nuts engaging opposite sides of the lever 17. The lever 17 is normally balanced against spring members 21 and 28 for zero reading of the indicator 27 on the scale 26, but upon passing a pole tip, such as pole tip 15 in engagement with the plunger 16, a reading on scale 26 is obtained showing the grinding depth of the pole tip. Oversize pole tips can be readily detected by the abutment of the pole tip with the plunger 16 and while observing the reading of indicator with respect to scale 26. By regrinding the pole tips and again testing the grinding depth the required normal reading may be finally obtained and the electromagnetic sound reproducer passed for the next step in the production program.

The machine may be readily adapted for various sizes of electromagnetic sound reproducers and a normal setting for the required grinding depth readily adjusted by means of screw devices 18 and 20.

The machine of my invention has proven very effective in quantity production of electromagnetic sound reproducers and insures the more uniform operation of the sound reproducers which pass through the production program and are presented for inspection prior to acceptance and shipment.

While I have described the testing machine in one of its preferred constructions, I desire that it be understood that modifications in detail may be made and that no limitations upon my invention are intended other than are imposed by the scope of the appended claims.

What I claim as new and desire to secure by Letters Patent of the United States is as follows:

1. A machine for testing the grinding depth of electromagnetic sound reproducers comprising a supporting base, means for receiving an electromagnetic sound reproducer in spaced relation to said base, with the pole tips thereof depending toward said base, a pivoted lever carried on said base, a micrometer mounted adjacent one end of said lever for measuring the displacement of said lever, and means mounted upon the other end of said lever for engaging the pole tips of said electromagnetic sound reproducer for effecting a displacement of said lever for measuring the grinding depth of said pole tips on said micrometer.

2. A machine for testing the grinding depth of the pole tips of an electromagnetic sound reproducer comprising a base member, a pair of adjustable bars for receiving the electromagnetic sound reproducer with the pole tips thereof depending downwardly toward said base member, a lever pivotally mounted upon the under-surface of said base, an adjustable member carried by each end of said lever, a micrometer positioned upon one end of said base for engagement with the adjustable member on one end of said lever, the adjustable member on the opposite end of said lever being arranged to be depressed by the pole tips of the electromagnetic sound reproducer as said electromagnetic sound reproducer is moved over said bars for effecting a deflection of said micrometer and directly indicating the grinding depth of said pole tips.

3. A machine for testing the grinding depth of pole pieces of an electromagnetic sound reproducer comprising a base member, a pair of supporting bars adjustably positioned on said base member, a lever pivotally mounted beneath said base member, a screw device adjustably positioned in each end of said lever and extending upwardly through said base, a micrometer carried by said base and controlled by the screw device in one end of said lever, the electromagnetic device on test being positioned on said supporting bars with the pole tips thereof arranged to engage the screw device in the opposite end of said lever for effecting a displacement of said lever and indicating the grinding depth of said pole tips by readings of said micrometer.

In testimony whereof I affix my signature.

RAY H. STACY.